United States Patent [19]

Endoh et al.

[11] E Patent Number: Re. 33,547

[45] Reissued Date of Patent: Mar. 5, 1991

[54] GRADED FACSIMILE IMAGE SIGNAL CODING SYSTEM

[75] Inventors: Toshiaki Endoh, Tanashi, Tokyo; Yasuhiro Yamazaki, Machida, both of Japan

[73] Assignee: Kokusai Denshin Denwa Kabushiki Kaisha, Tokyo, Japan

[21] Appl. No.: 326,961

[22] Filed: Mar. 22, 1989

Related U.S. Patent Documents

Reissue of:

[64] Patent No.: 4,652,935
Issued: Mar. 24, 1987
Appl. No.: 833,370
Filed: Feb. 25, 1986

[30] Foreign Application Priority Data

Mar. 4, 1985 [JP] Japan ..... 60-41084

[51] Int. Cl.[5] ..... H04N 1/41

[52] U.S. Cl. ..... 358/426; 358/261.3; 358/447

[58] Field of Search ..... 358/261.3, 426, 429, 358/430, 447; 382/56

[56] References Cited

U.S. PATENT DOCUMENTS

| | | | |
|---|---|---|---|
| 4,150,401 | 4/1979 | Yamamoto et al. | 358/284 |
| 4,266,249 | 5/1981 | Chai et al. | 358/133 |
| 4,414,580 | 11/1983 | Johnsen et al. | 358/263 |
| 4,578,704 | 3/1986 | Gharavi | 358/135 |
| 4,598,372 | 7/1986 | McRoberts | 358/260 |

*Primary Examiner*—Edward L. Coles, Sr.
*Attorney, Agent, or Firm*—Emmanuel J. Lobato; Robert E. Burns

[57] ABSTRACT

A graded facsimile image signal coding system is disclosed which is provided with means for distributing a multi-graded facsimile picture signal, represented by $2^n$ gradation levels, into n bit planes corresponding to n digits; initial encoding means for detecting, from picture elements forming each bit plane, picture elements at intervals of $\Delta X$ picture elements on every $\Delta Y$-th line and encoding the detected picture elements; and additional coding means for [further] coding each one of [said encoded] *picture elements except said detected* picture elements with reference to encoded four picture elements positioned around said one picture element to be coded.

3 Claims, 9 Drawing Sheets

Fig. 1
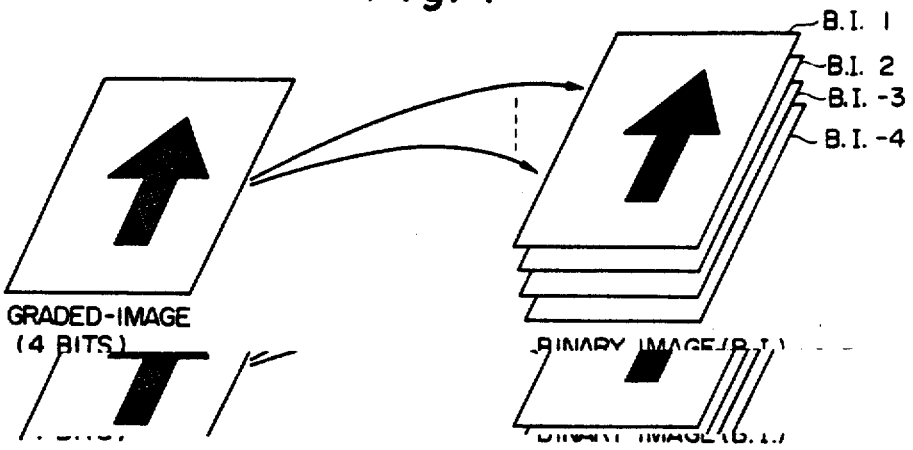
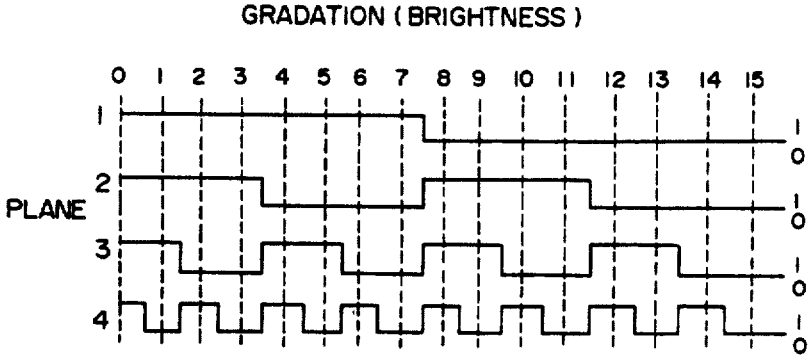
Fig.2A
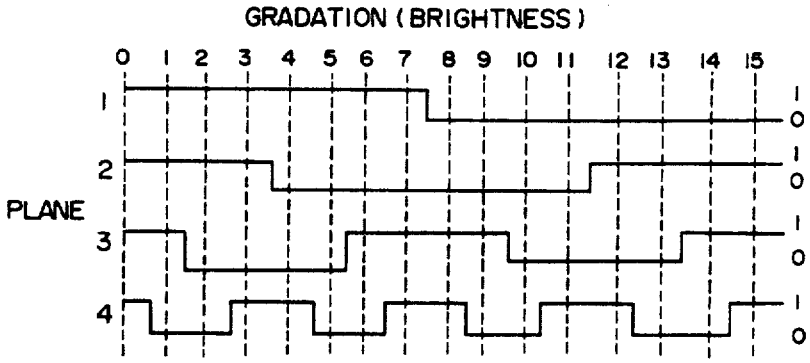
Fig.2B

GRADED FACSIMILE IMAGE SIGNAL CODING SYSTEM

Matter enclosed in heavy brackets [ ] appears in the original patent but forms no part of this reissue specification; matter printed in italics indicates the additions made by reissue.

BACKGROUND OF THE INVENTION

The present invention relates to a facsimile signal coding system which permits the receiving station to freely select the quality of a reproduced image, and more particularly to a facsimile signal coding system of particular utility when employed in conversational image communication or image data base retrieval which combines a facsimile terminal with a display unit.

Conventional facsimile communication is paper-to-paper communication and is usually intended to obtain a hard copy. However, there is a tendency that the demand for image processing will be diversified in the future, but at present, the prior art does not possess functions which cope with such a situation.

It is considered that the diversification of facsimile communication will involve the combined use of a facsimile terminal and a display unit for conversational image communication and video data base retrieval. In such conventional image communication, for realizing a smooth conversation in the case of graphic information having a large amount of data, a progressive coding system which provides a rough display of the entire image on a display in as early a stage as possible and then gradually improves the picture quality is more effective than a conventional image coding system which successively reproduces complete pictures along scanning lines from the top to the bottom of the image.

With the sequential progressive coding system, the receiver can decide, from the rough display, whether the information being transmitted is desired one, and if not, he can stop the subsequent unnecessary data transmission. If the information is desired one, then its image quality is improved until the receiver is satisfied, and if necessary, a hard copy of the picture at that time can also be obtained. Thus, the progressive coding system is a coding system that permits the selection of picture quality, a rapid retrieval and curtailment of communication costs, and hence is suitable for interactive image communication. Especially, the sequential progressive coding system is effective for a graded image since it has a large amount of information.

The quality of the graded image depends upon resolution and the number of gradation levels. Accordingly, one possible method for progressively improving the image quality by the progressive coding system is to gradually enhance resolution, and the other is to gradually increase the number of gradation levels. Conventional progressive coding systems for a graded image employ the method of gradually increasing only the number of gradation levels, the method of gradually improving resolution alone or a method of simultaneously increasing the number of gradation levels and resolution in accordance with predetermined algorithms. None of the prior art progressive coding systems is capable of increasing the number of gradation levels and raising resolution independently of each other.

SUMMARY OF THE INVENTION

An object of the present invention is to provide a progressive coding system for a graded image which is capable of increasing the number of gradation levels and improving resolution independently of each other so as to obviate the above defect of the prior art.

To attain the above object of the present invention, there is proposed a graded facsimile image signal coding system, comprising means for distributing a multi-graded facsimile picture signal, represented by $2^n$ gradation levels, into n bit planes corresponding to n digits; initial encoding means for detecting, from picture elements forming each bit plane, picture elements at intervals of $\Delta X$ picture elements on every $\Delta Y$-th line and encoding the detected picture elements; and additional coding means for [further] coding each one of said *picture elements except said detected* [encoded] picture elements with reference to encoded four picture elements positioned around said one picture element to be coded.

BRIEF DESCRIPTION OF THE DRAWINGS

The present invention will be described in detail below with reference to the accompanying drawings, in which:

FIG. 1 is a schematic perspective view for explaining the division of an image by a bit plate system for use in the present invention;

FIGS. 2A and 2B are diagrams each explanatory of the relationship between each plane and gradation for use in the present invention;

DETAILED DESCRIPTION

Figure 3:
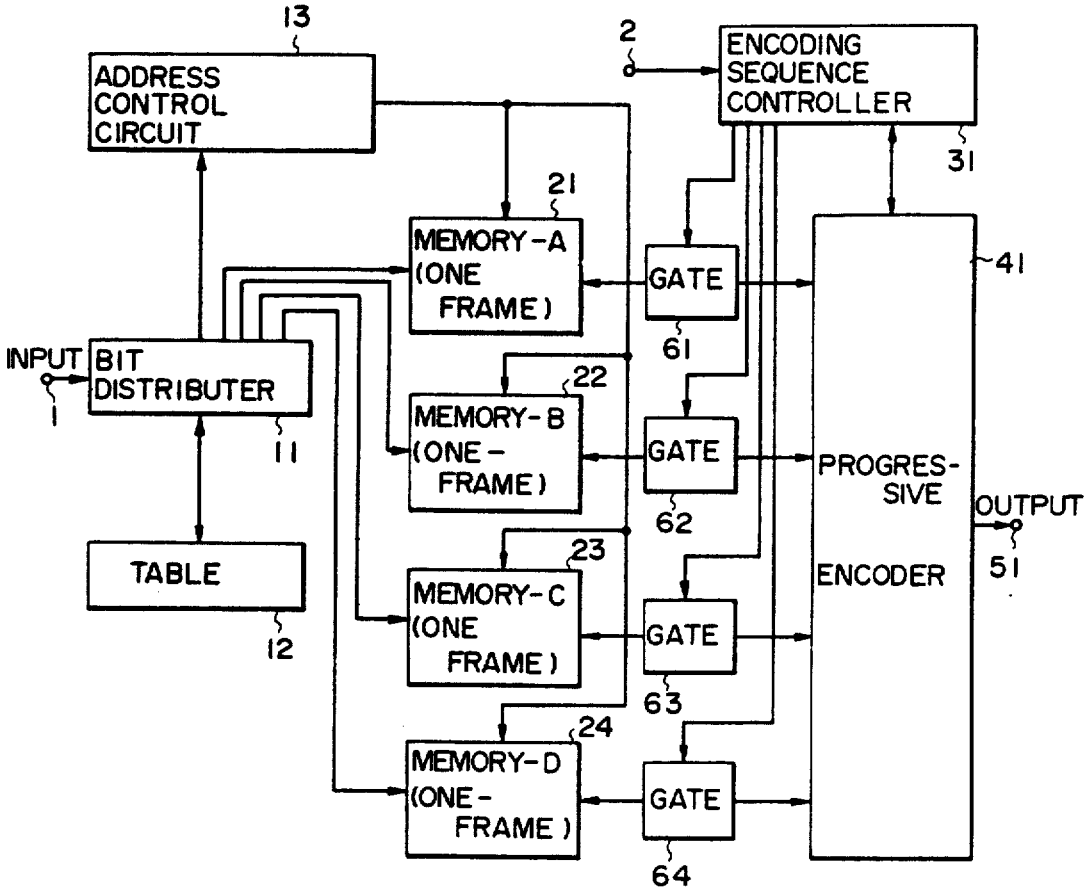
FIG. 3 is a block diagram illustrating an embodiment of the present invention.

The principle of the present invention will first be described.

Now, let it be assumed that an original image to be encoded is a multilevel image having $2^N$ gradation levels with each picture element represented by N bits.

The following description will be given of a case where the value N is 4.

At first, an image of one frame is resolved by a bit plane system into four binary image planes as depicted in FIG. 1. The value of each bit plane is determined to be "0" (a white picture element) or "1" (a black picture element) according to the value of the gradation of the picture element. FIG. 2 shows two examples of this determination.

FIG. 2A is a diagrammatic representation of the value of the gradation of the original picture element by binary signals. For instance, when the gradation is 8, the binary signals are "0111". The bit planes 1, 2, 3 and 4 are sequentially assigned the signals, starting at the MSB, and hence assume values "0", "1", "1", "1" and "1", respectively. However, the method using the binary signals described above has a defect of involving many change points.

FIG. 2B shows an example in which a binary signal is assigned to each gradation level with a view for minimizing the number of change points in the representation of $2^4$ gradation levels. This method provides for enhanced coding efficiency.

Accordingly, the following description will be given on the assumption that the method shown in FIG. 2B is employed.

At the receiving side the binary image can be reproduced by receiving information of the plane 1 at first. That is, it is necessary only to display the signals "0" and "1" corresponding to white and black picture elements, respectively. Then, by receiving information of the plane 2 and combining it with the already received information of the plane 1, an image of four gradation levels can be reproduced. Let the four gradation levels by represented by "brightness 4", "brightness 3", "brightness 2" and "brightness 1" in order of brightness, beginning with the highest. Thus it is necessary only to display "brightness 1" when the information of the planes 1 and 2 is the value of "1", "brightness 2" when the information of the plane 1 is the value of "1" and the information of the plane 2 the "0", "brightness 3" when the information of the planes 1 and 2 is the value of "0" and "brightness 4" when the information of the plane 1 is the value of "0" and the information of the plane 2 is the value of "1". Similarly, by receiving information of the plane 3 and combining it with the information of the planes 1 and 2 already received, an image of eight gradation levels can be reproduced. Furthermore, by receiving information of the plane 4 and combining it with the already received information of the planes 1, 2 and 3, an image of 16 gradation levels can be reproduced. In this way, the number of gradation levels can be selected in dependence upon to which plane information is received.

Each binary-coded plane is encoded by a progressive coding system for a binary image described later. For convenience of description, let it be assumed that the original picture has the resolution of sixteen picture elements/mm. With the progressive coding system for a binary image, it is possible to gradually improve the quality of the received image by receiving a rough image at first and then receiving additional information. For example, encoded information of an image with the resolution of one picture element/mm, thinned out of the original image at intervals of sixteen picture elements both lengthwise and breadthwise thereof, is received at first. Next, additional information is received for the image having the resolution of 1 picture element/mm, obtaining an image with a resolution of 2 picture elements/mm. Furthermore, additional encoding information is received for the image with the resolution of 2 picture elements/mm, obtaining an image having a resolution of 4 picture elements/mm. By similar operations images with resolution of 8 picture elements/mm and 16 picture elements/mm can be obtained. By encoding the original image with such a progressive coding system, the resolution of the received image can be selected depending upon to which additional information is received.

The number of gradation levels can be selected depending upon to which plane information is received, and the resolution of the picture can also be selected depending upon to which additional encoding information of the progressive coding scheme for a binary image is received. Thus, this system is a progressive coding scheme for a graded image which enables the number of gradation levels and resolution to be increased independently of each other.

The resolution and the gradation representing ability of terminals which access an image data base center are not always common to them. Accordingly, in case of sending the same image data, the situation may sometimes arise where it is necessary to send an image of, high resolution to some terminals and an image of high gradation to some other terminals. In such a case, if the conventional coding system is used, it will be necessary to store the original image and encode it each time in accordance with the ability of each receiving terminal. This calls for many memories and complex processing steps. With the coding system of the present invention, however, the process involved is simplified and the storage capacity used is reduced by storing images in the data base through a method described below.

Table 1 shows a method of storing encoding information of images. At first, encoding information of an image having a resolution of 1 picture element/mm, thinned out of the original image at intervals of 16 picture elements lengthwise and breadthwise thereof, is stored in conjunction with the plane 1. Next, additional encoding information is stored which is needed for improving the 1 picture element/mm resolution of the image to 2 picture elements/mm. In a similar manner, additional encoding information, for raising the resolution of the image to 4 picture elements/mm, additional encoding information for improving the resolution of the image to 8 picture elements/mm and additional encoding information for raising the resolution of the image to 16 picture elements/mm are sequentially stored. Likewise, encoding information is stored for the planes 2, 3 and 4, as shown in Table 1.

For example, in the case of displaying on a receiving terminal an image having a resolution of 8 picture elements/mm and 8 gradation levels, it will suffice to receive encoding information 1, 2, 3, 4, 6, 7, 8, 9, 11, 12, 13 and 14. By displaying the received information at the receiving terminal each time, it is possible to implement a method of providing a general or rough display of the whole image at an early stage and then improving its image quality as referred to previously. The order of reception of information is not limited specifically to the encoding information 1, 2, 3, 6, 7, 8, 9, 11, 12, 13, 14 but may also be the encoding information 1, 6, 11, 2, 7, 12, 3, 8, 13, 4, 9, 14. In the case of the former, an image of high resolution can be obtained at a relatively early point of time and thereafter the gradation increases. In contrast thereto, in the case of the latter, an image of high gradation is obtained and then its resolution improves.

TABLE 1

| Resolution of Image | Plane 1 | Plane 2 | Plane 3 | Plane 4 |
|---|---|---|---|---|
| 1 picture element/mm | 1 | 6 | 11 | 16 |
| 2 picture elements/mm | 2 | 7 | 12 | 17 |
| 4 picture elements/mm | 3 | 8 | 13 | 18 |
| 8 picture elements/mm | 4 | 9 | 14 | 19 |

TABLE 1-continued

| Resolution of Image | Plane 1 | Plane 2 | Plane 3 | Plane 4 |
|---|---|---|---|---|
| 16 picture elements/mm | 5 | 10 | 15 | 20 |

Next, FIG. 3 illustrates an example of the circuit arrangement for emboding the coding system of the present invention. In the description given below of this example the number of gradations of the original image is 16 (4 bits).

FIG. 3 shown an example of an encoding circuit. Reference numerals 1 and 2 indicate input terminals, 11 a bit distributer, 12 a table, 13 an address control circuit, 21, 22, 23 and 24 one-frame memories, 31 an encoding sequence controller, 41 a progressive encoder, 51 an output terminal and 61, 62, 63 and-64 gates. A detailed description will be given of operations of the circuit depicted in FIG. 3. From the input terminal 1 signals of an original image to be encoded are sequentially received, for each picture element, in order from left to right and top to bottom, starting at the top left-hand corner of the original image. The input signals are transferred to the bit distributor 11, wherein each picture element represented by four bits is split into four 1-bit signals through utilization of the table 2. The bit signals are provided to the one-frame memories 21, 22, 23 and 24, respectively. The table 12 is such, for example, as shown in Table 2. Table 2 shows signal values which are provided to the one-frame memories for each gradation signal. For instance, when the image received from the input terminal has a value "6", the one-frame memories (A)21, (B)22, (C)23 and (D)24 are supplied with signals "1", "0", "1" and "0", respectively. The address control circuit 13 specifies the coordinates of the one-frame memories 21, 22, 23 and 24 where to store the bit signals from the bit distributor 11. In each of one-frame memories 21, 22, 23 and 24 information of one-image frame is stored, under control of the address control circuit 13, in the same order as that in which the signals are read out of the original picture (i.e. from left to right and top to bottom, starting at the upper left-hand corner of the original image. Upon completion of the information transfer to the one-frame memories 21, 22, 23 and 24, the progressive encoder 41 starts its encoding operation. The encoding sequence controller 31 has prestored therein the sequence of encoding from the input terminal 2. By enabling any one of the gates 61 to 64 in accordance with the prestored encoding sequence, the encoding sequence controller 31 selects the plane to be encoded and at the same time controls the progressive encoder 41. Encoded information from the progressive encoder 41 is delivered from the output terminal 51.

lines $l_m$ to $l_{m+2\Delta y}$ extracted from a certain part of a picture element signal.

Figure 4:
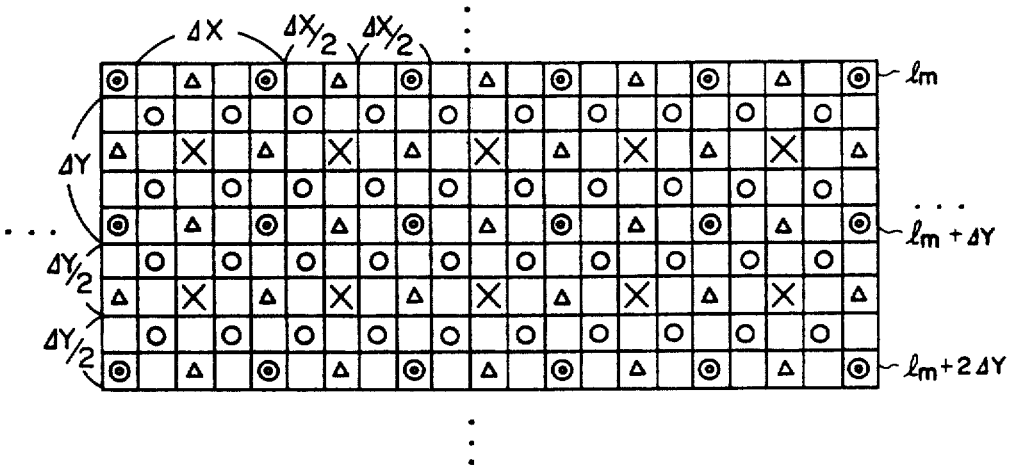
FIGS. 4, 5, 6A, 6B, 7A, 7B, 7C 7D, 8A, 8B, 8C and 8D are diagrams showing picture element arrangement patterns for explaining the principles of encoding for use in the present invention.

(i) According to the present invention, picture elements marked with double circles, which are spaced apart $\Delta X=2^n$ (where $n=1,2,3,\ldots$) picture elements in a lateral direction (on scanning lines) and $\Delta Y=2^n$ (where $n=1, 2, 3, \ldots$) picture elements in a vertical directions, are detected, and they are linked together without being divided for each line and encoded into run-length codes. FIG. 4 shows a case where $n=2$, that is, where every four picture elements are detected on every fourth line.

Figure 5:
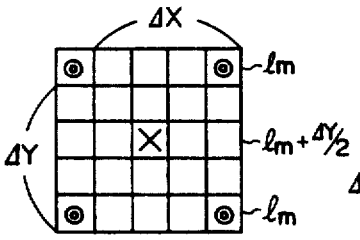

(ii) Next, picture elements marked with crosses are encoded and in this case, the picture elements marked with double circles are referred to. That is to say, for the encoding of the cross-marked picture elements, four already-coded double-circled picture elements are referred to which are spaced apart from the cross-marked picture element by $\Delta X/2$ in the lateral direction and $\Delta Y/2$ in the vertical direction, as shown in FIG. 5. What is intended to mean by "referred to" is to judge the amount of information which is given to the quality of the cross-marked picture element to be encoded. The four double-circled reference picture elements assume the following five statuses:

Status 0: the four picture elements are all white picture elements.

Status 1: only one of the four picture elements is a black picture element.

Status 2: two of the four picture elements are black picture elements.

Status 3: three of the four picture elements are black picture elements

Status 4: the four picture elements are all black picture elements.

Of the above statuses, the cross-marked picture element in the status 2 is considered to correspond to the contour of an image since two picture elements are white and other two picture elements are black, and the picture quality is greatly affected depending upon whether the cross-marked picture element lying at the center is white or black. Accordingly, if the cross-marked picture element in the status 2 is coded and transmitted prior to the other picture elements, then the picture quality at the receiving side can be markedly improved. From such a point of view, according to the present invention, picture elements are encoded in the order of status 2-status 3-status 1-status 4-status 0.

In the status 0 and the status 4, if an interpolation process (a sort of prediction) is carried out at the receiving side, then it is very likely that the cross-marked picture element is interpolated to white in the status 0

TABLE 2

| One-Frame Memories | Graduation Signals | | | | | | | | | | | | | | | |
|---|---|---|---|---|---|---|---|---|---|---|---|---|---|---|---|---|
| (Planes) | 0 | 1 | 2 | 3 | 4 | 5 | 6 | 7 | 8 | 9 | 10 | 11 | 12 | 13 | 14 | 15 |
| A | 1 | 1 | 1 | 1 | 1 | 1 | 1 | 1 | 0 | 0 | 0 | 0 | 0 | 0 | 0 | 0 |
| B | 1 | 1 | 1 | 1 | 0 | 0 | 0 | 0 | 0 | 0 | 0 | 0 | 1 | 1 | 1 | 1 |
| C | 1 | 1 | 0 | 0 | 0 | 0 | 1 | 1 | 1 | 1 | 0 | 0 | 0 | 0 | 1 | 1 |
| D | 1 | 0 | 0 | 1 | 1 | 0 | 0 | 1 | 1 | 0 | 0 | 1 | 1 | 0 | 0 | 1 |

A detailed description will hereinafter be given, with reference to the drawings, of algorithms of the progressive coding system for an image represented by the binary signals.

FIGS. 4 to 8 are diagrams conceptually showing the picture element coding sequence according to the present invention. FIG. 4 is a diagrammatic showing of nine and to black in the status 4; therefore, its encoding may also be omitted in some cases.

The mode of encoding in a case where the double-circled picture elements lie at the four corners of the square, as shown in FIG. 5, will hereinafter be referred to as the mode 1, and this mode for each status N (where $N=0, \ldots, 5$) will hereinafter be called the mode 1-N.

Figure 6A:
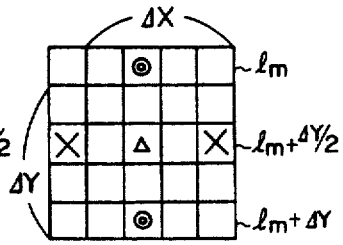
Figure 6B:
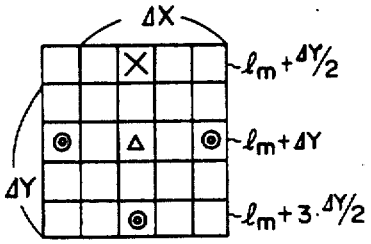
Figure 7A:
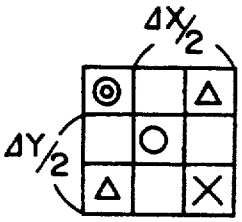
Figure 7B:
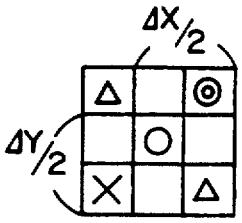
Figure 7C:
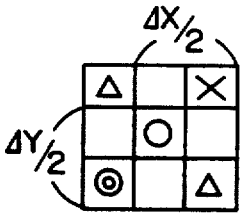
Figure 7D:
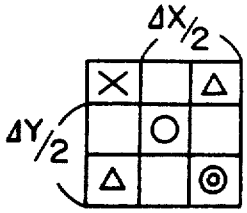
Figure 8A:
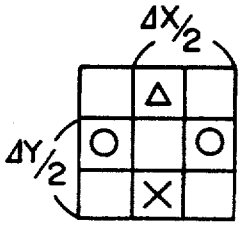
Figure 8B:
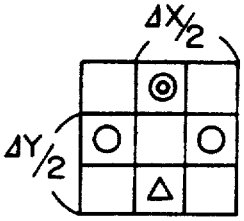
Figure 8C:
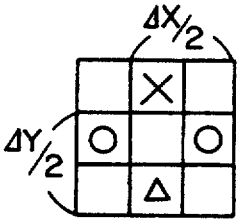
Figure 8D:
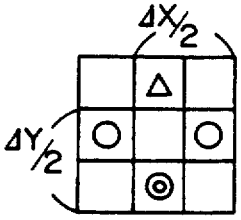

(iii) Next, picture elements marked with triangles in FIG. 4 are each encoded by referring to the double-circled and cross-marked picture elements already encoded. In this case, the reference picture elements lie above and below the triangle-marked picture element to be encoded and on the right and the left thereof at distances therefrom of $\Delta X/2$ and $\Delta Y/2$, as shown in FIG. 6. This mode of encoding will hereinafter be referred to as the mode 2. The statuses which the reference picture elements can assume are the same as the aforementioned statuses 0 to 4, and the encoding sequence for the triangle-marked picture elements, taking into account the statuses of the reference picture elements, is also the same as described above. The mode of encoding in each status will hereinafter be referred to as the mode 2-N (where N=0, . . . 4).

(iv) Next, picture elements marked with single circles in FIG. 4 are encoded. FIGS. 7A to 7D show the patterns of reference picture elements in the case of the mode 1, and the reference picture elements lie distant $\Delta X/2$ and $\Delta Y/2$ from the single-circled picture element to be encoded. That is to say, it is necessary only to reduce the distance of extraction of the reference picture elements by half in the procedure of encoding the cross-marked picture elements.

(v) Finally, blank picture elements in FIG. 4 are encoded. FIGS. 8A to 8D show the patterns of reference picture elements in the case. In the encoding mode 2, the distance from the picture element to be encoded to each reference picture element is ½ that in the case of encoding the triangle-marked picture element.

The encoding operations in the mode 1 and the mode 2 are repeated, with the intervals between the reference picture elements reduced by half, as described above. When the intervals between them becomes $2^1$, it means completion of the encoding of all picture elements.

While in the example shown in FIG. 4 the values $\Delta X$ and $\Delta Y$ are selected so that $2^2=4$, the value n in the $2^n$ is arbitrarily selectable. Further, the $\Delta X$ and 66 Y need not always be set to the same value; namely, it is necessary only that when the interval between the reference picture elements becomes 2, the interval between reference picture in that direction be fixed to 2 and the encoding in the mode 1 and the mode 2 be carried out until the interval between reference picture elements in the other direction becomes 2.

Details of the above-described coding procedures are as follows:

Procedure 1-1: $\Delta X$ and $\Delta Y$ are determined by $2^n$ (where n=1, 2, 3, 4, . . . )

Procedure 1-2: Letting the coordinates of picture elements be represented by P $(X.\Delta X+1,\ Y.\Delta X+1)$ (where X, Y=0, 1, . . . ), the picture elements P are linked together from left to right and top to bottom without being divided for each line, and they are encoded into run-length codes.

Procedure 1-3: Encoding takes place in accordance with algorithms shown in Procedures 2-1 to 2-10 described later.

Procedure 1-4: $\Delta X$ is set to $\Delta X/2$, and Y is set to $\Delta Y/2$.

Procedure 1-5: If $\Delta X$ and $\Delta Y$ are both 1 (2 at the end of the Procedure 1-3), then encoding is finished, and if not, the operation proceeds to the Procedure 1-3.

Procedures 2-1 to 2-10 are as follows:

Procedure 2-1: Picture elements in the mode 1-2 are encoded. All picture elements which are in the mode 1-2 are all linked together one after another without being divided for each line, and they are encoded into run-length codes. The encoding is effected on the assumption, as an initial condition, that a black picture element in the mode 1-2 virtually exists at the head of the picture.

Procedure 2-2: Picture elements in the mode 1-3 are encoded. All picture elements which are in the mode 1-3 are all linked together one after another without being divided for each line, and they are encoded into run-length codes. The encoding is effected on the assumption, as an initial condition, that a black picture element in the mode 1-3 virtually exists at the head of the picture.

Procedure 2-3: Picture elements in the mode 1-1 are encoded. All picture elements which are in the mode 1-1 are all linked together one after another without being divided for each line, and they are encoded into run-length codes. The encoding is effected on the assumption, as an initial condition, that a white picture element in the mode 1-1 virtually exists at the head of the picture.

Procedure 2-4: Picture elements in the mode 1-4 are encoded. All picture elements which are in the mode 1-4 are all linked together one after another without being divided for each line, and they are encoded into run-length codes. The encoding is effected on the assumption, as an initial condition, that a black picture element in the mode 1-4 virtually exists at the head of the picture.

Procedure 2-5: Picture elements in the mode 1-0 are encoded. All picture elements which are in the mode 1-0 are all linked together one after another without being divided for each line, and they are encoded into run-length codes. The encoding is effected on the assumption, as an initial condition, that a white picture element in the mode 1-0 virtually exists at the head of the picture.

Procedure 2-6: Picture elements in the mode 2-2 are encoded. All picture elements which are in the mode 2-2 are all linked together one after another without being divided for each line, and they are encoded into run-length codes. The encoding is effected on the assumption, as an initial condition, that a black picture element in the mode 2-2 virtually exists at the head of the picture.

Procedure 2-7: Picture elements in the mode 2-3 are encoded. All picture elements which are in the mode 2-3 are linked together one after another without being divided for each line, and they are encoded into run-length codes. The encoding is effected on the assumption, as an initial condition, that a black picture element in the mode 2-3 virtually exists at the head of the picture.

Procedure 2-8: Picture elements in the mode 2-1 are encoded. All picture elements which are in the mode 2-1 are linked together one after another without being divided for each line, and they are encoded into run-length codes. The encoding is effected on the assumption, as an initial condition, that a white picture element in the mode 2-1 virtually exists at the head of the picture.

Procedure 2-9: Picture elements in the mode 2-4 are encoded. All picture elements which are in the mode 2-4 are linked together one after another without being divided for each line, and they are encoded into run-length codes. The encoding is effected on the assumption, as an initial condition, that a black picture element in the mode 2-4 virtually exists at the head of the picture.

Procedure 2-10: Picture elements in the mode 2-0 are encoded. All picture elements which are in the mode 2-0 are linked together one after another without being divided for each line, and they are encoded into run-length codes. The encoding is effected on the assumption, as an initial condition, that a white picture element in the mode 2-0 virtually exists at the head of the picture.

Next, codes for use in each encoding procedure will be exemplified. A code assignment table for use in Procedure 1-2 is shown in Table 3.

TABLE 3

| ΔX × ΔY | code white run | code black run |
|---|---|---|
| 16 × 16 | WYLE | 1-2 |
| 8 × 8 | WYLE | 1-2 |
| 4 × 4 | 1-2 | 1-2 |
| 2 × 2 | WYLE | MH(W) |

In Table 3, MH(W) means a code for a white run of the MH coding scheme, and WYLE known WYLE codes Table 4 shows terminating codes of MH(W), Table 5 makeup codes and Table 6 WYLE codes.

Incidentally, 1-2 in Table 3 is a code peculiar to the present invention. In the case of it being expressed by "N-2", when the run length is within the range of 1 to $2^{n-1}$, an N-bit code is used, and when the run length exceeds $N^{N-1}+1$, a required number of bits are added by steps of two (one of which is a flag bit). Table 7 shows its example.

TABLE 4

| Run length | MH(W) |
|---|---|
| 0 | 00110101 |
| 1 | 000111 |
| 2 | 0111 |
| 3 | 1000 |
| 4 | 1011 |
| 5 | 1100 |
| 6 | 1110 |
| 7 | 1111 |
| 8 | 10011 |
| 9 | 10100 |
| 10 | 00111 |
| . | . |
| . | . |
| . | . |
| 60 | 01001011 |
| 61 | 00110010 |
| 62 | 00110011 |
| 63 | 00110100 |

TABLE 5

| Run length | MH(W) |
|---|---|
| 64 | 11011 |
| 128 | 10010 |
| 192 | 010111 |
| 256 | 0110111 |
| 320 | 00110110 |
| . | . |
| . | . |
| . | . |
| 1600 | 010011010 |
| 1664 | 011000 |
| 1728 | 010011011 |
| ELO | 000000000001 |

TABLE 6

| Run length | WYLE CODE (* is a binary number) |
|---|---|
| 1 to 2 | 0* |
| 3 to 6 | 10** |
| 7 to 14 | 110*** |
| 15 to 30 | 1110**** |
| 31 to 62 | 11110***** |
| . | . |
| . | . |
| . | . |

TABLE 7

| Run length | 1-2 code (*is a binary number) |
|---|---|
| 1 | 0 |
| 2 to 3 | 10* |
| 4 to 7 | 110** |
| 8 to 15 | 1110*** |
| 16 to 31 | 11110**** |
| 32 to 63 | 111110***** |
| . | . |
| . | . |
| . | . |

codes for Procedure 1-3 are used properly in accordance with the code assignment shown in Table 8, for instance. In the table, NON means the encoding of white of a picture signal into a "0" and black into a"1", and the table is identical in contends with Table 1 except in this regard.

TABLE 8

| ΔX × ΔY | mode white, black | status 0 | status 1 | status 2 | status 3 | status 4 |
|---|---|---|---|---|---|---|
| 16 × 16 | 1-white- | MH(W) | 2-2 | 1-2 | NON | 1-2 |
| 16 × 16 | 1-black- | 1-2 | 1-2 | 1-2 | NON | WYLE |
| 16 × 16 | 2-white- | MH(W) | SYLE | 1-2 | 1-2 | 1-2 |
| 16 × 16 | 2-black- | 1-2 | 1-2 | 2-2 | 1-2 | 1-2 |
| 8 × 8 | 1-white- | MH(W) | 1-2 | 1-2 | 1-2 | 1-2 |
| 8 × 8 | 1-black- | 1-2 | 1-2 | 1-2 | 1-2 | 1-2 |
| 8 × 8 | 2-white- | WYLE | WYLE | 1-2 | 1-2 | 1-2 |
| 8 × 8 | 2-black- | 1-2 | 1-2 | 1-2 | 2-2 | WYLE |
| 4 × 4 | 1-white- | WYLE | 1-2 | NON | 1-2 | 1-2 |
| 4 × 4 | 1-black- | 1-2 | 1-2 | NON | 1-2 | WYLE |
| 4 × 4 | 2-white- | 11-2 | WYLE | NON | 1-2 | 1-2 |
| 4 × 4 | 2-black- | 1-2 | 1-2 | NON | WYLE | WYLE |
| 2 × 2 | 1-white- | WYLE | WYLE | 1-2 | 1-2 | 1-2 |
| 2 × 2 | 1-black- | 1-2 | 1-2 | 1-2 | WYLE | 8-2 |
| 2 × 2 | 2-white- | WYLE | WYLE | NON | 1-2 | 1-2 |
| 2 × 2 | 2-black- | 1-2 | 1-2 | NON | WYLE | 11-2 |

Figure 9:
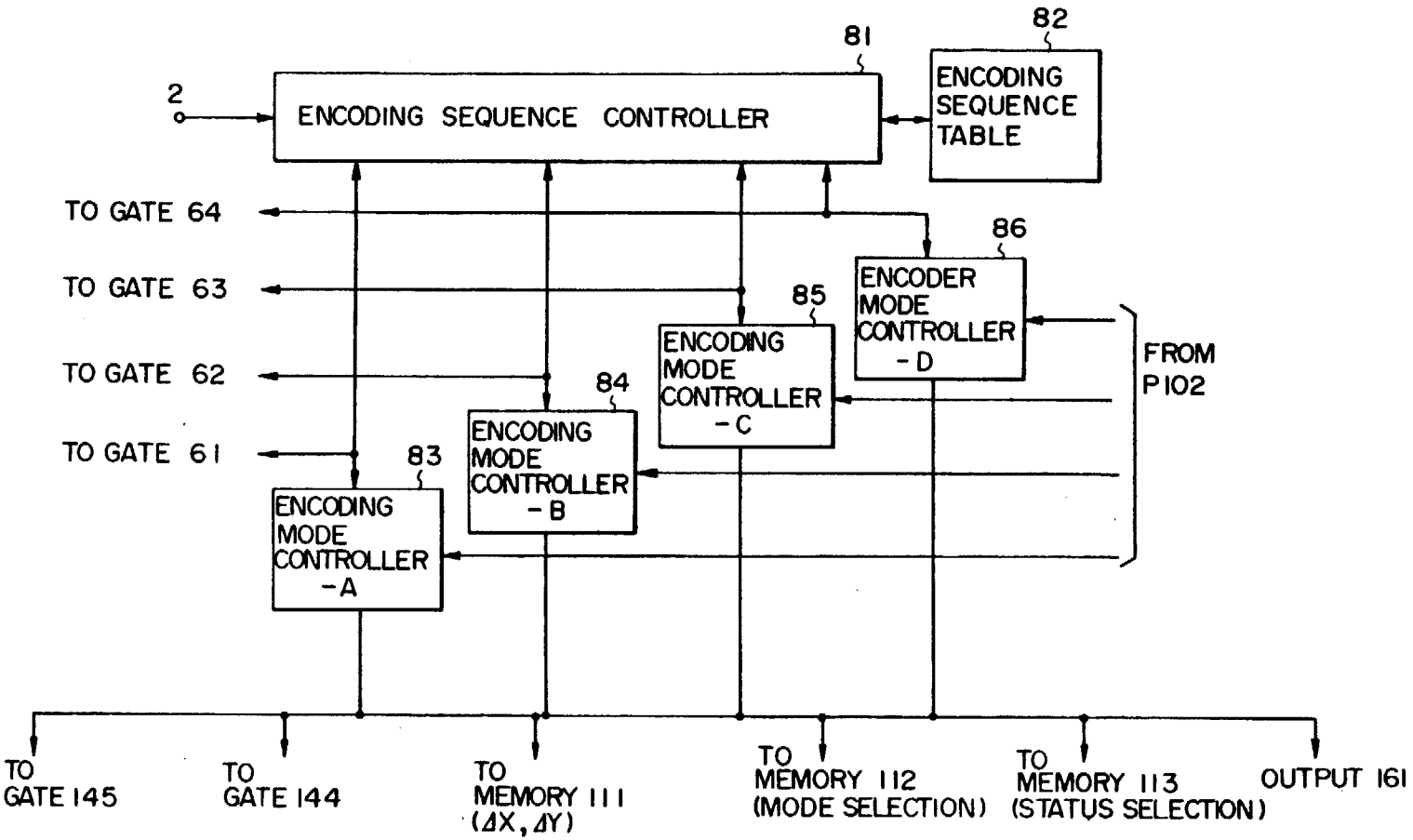
FIG. 9 is a block diagram illustrating an example of an encoding sequence controller used in the present invention.

With reference to the drawings, the encoding sequence controller 31 will hereinafter be described in detail. FIG. 9 illustrates an example of the circuit arrangement of the encoding sequence controller 31. Reference numeral 81 indicates an encoding sequence controller, 182 an encoding sequence table, 83 an encoding mode controller A which effects control for encoding of the contents of the one-frame memory A and 84, 85 and 86 encoding mode controller for the one-frame memories B, C and D. The encoding mode controller 83, 84 85 and 86 each store information of the ΔX and ΔY encoding modes to thereby store the stage to which the contents of the corresponding one-frame memory has been encoded. In the encoding sequence table 82 is prestored the sequence of encoding operation. An example is shown in Table 9. The encoding sequence controller 81 instructs the encoding mode controllers 83, 84, 85 and 86 for encoding in accordance with the sequence stored in the encoding sequence table 82. For instance, let it be assumed that the encoding sequence table 82 has set therein such a table as shown in Table 9 and that the encoding operation has already been completed to the encoding sequence 10. The encoding sequence controller 81 reads the contents of the encoding sequence 11 from the encoding sequence table 82. In order to encode the plane C in accordance with the readout contents, the encoding sequence controller 81 enables the gate 63 and at the same time instructs the encoding mode controller C85 to perform encoding from status 0 to 4 in the mode 1 with $\Delta X=4$ and $\Delta Y=4$. The encoding mode controller C85 carries out the encoding operation as instructed by the encoding sequence controller 81 and, upon completion of the encoding operation, sends out an end signal to the encoding sequence controller 81. Upon receiving the end signal, the encoding sequence controller 81 disables the gate 63 and reads out the contents of the encoding sequence 12 from the encoding sequence table 82 for effecting the next encoding operation. When all the contents of the encoding sequence table 82 have all be processed and the encoding operation of all the contents of the four one-frame memories 83, 84, 85 and 86 has been completed, all encoding operations are finished.

TABLE 9

| Encoding Sequence | Plane | ΔX | ΔY | Mode | Status |
|---|---|---|---|---|---|
| : | | | | | |
| : | | | | | |
| 10 | B | 4 | 4 | 2 | 0 to 4 |
| 11 | C | 4 | 4 | 1 | 0 to 4 |
| 12 | C | 4 | 4 | 2 | 0 to 4 |
| 14 | A | 2 | 2 | 1 | 0 to 4 |
| : | | | | | |
| : | | | | | |

TABLE 10

| Plane | Code |
|---|---|
| A | 00 |
| B | 01 |
| C | 10 |
| D | 11 |

Figure 10:
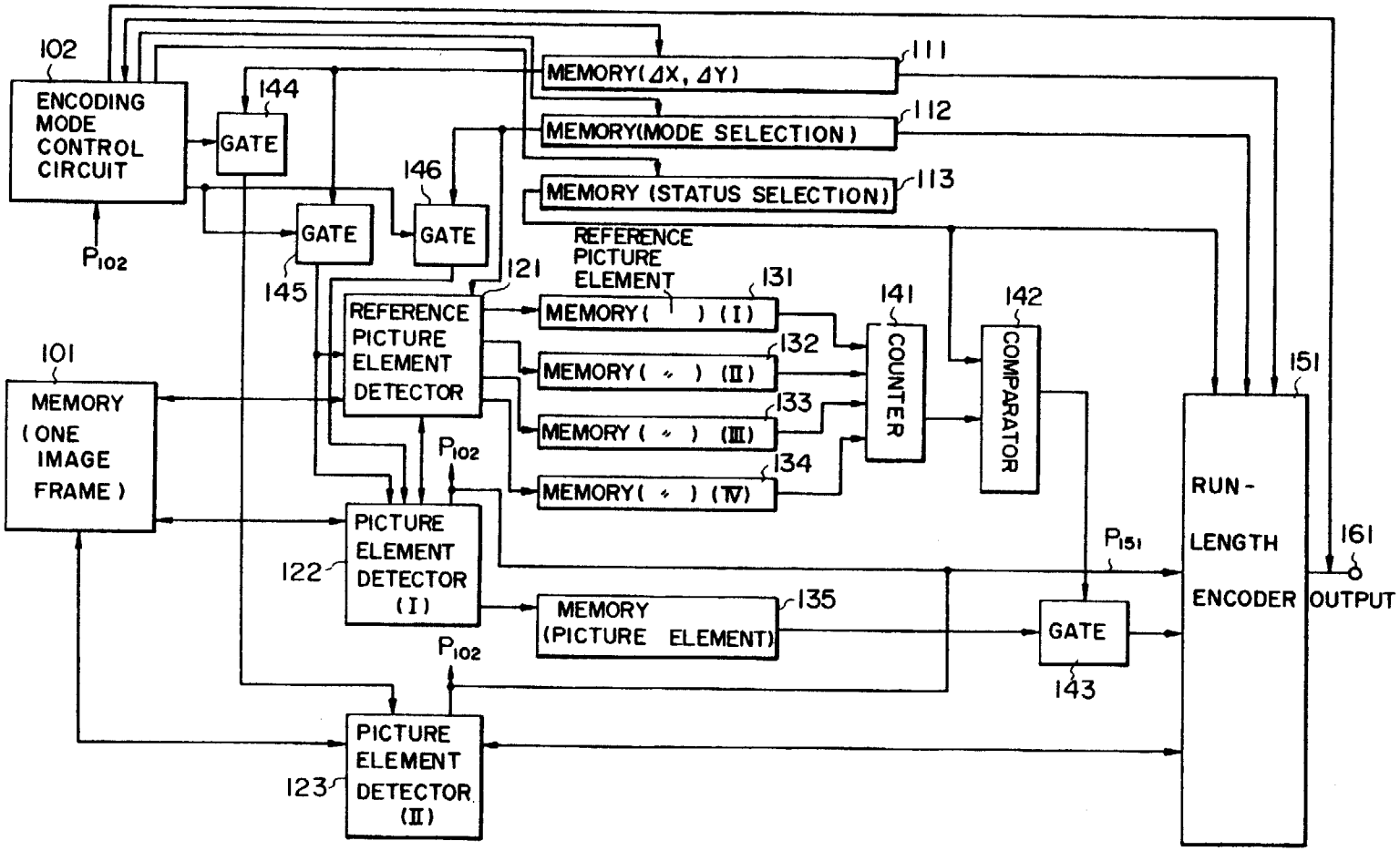
FIG. 10 is a block diagram illustrating an example of an encoder employed in the present invention.

FIG. 10 illustrates an example of the encoder 41. Reference numeral 101 identifies a one-frame memory for storing an image to be encoded, 102 an encoding mode control circuit for controlling a code, 111 a ΔX-ΔY memory for storing the values of ΔX and ΔY, 112 a mode selection memory, 113 a status selection memory, 121 a reference picture element detector for extracting the values of four reference picture elements from the one-frame memory; 122 and 123 picture element detectors for detecting from the one-frame memory 101 the values of picture elements to be encoded; 131, 132, 133 and 134 memories for storing the values of the four reference picture elements; 135 a memory for storing the value of a picture element to be encoded; 141 a counter for calculating the sum total of the values of the four reference picture elements; 142 a comparator for comparing a signal from the status select circuit 113 with the contents of the counter 141, 143, 144, 145 and 146 gate circuits; 151 a run-length encoder and 161 an output terminal.

In practice, four one-frame memories are employed as shown in FIG. 3, but it is assumed, for convenience of description, that the one-frame memory 101 is identical with the one-frame memory (one of the one-frame memories 83 to 86) which is connected directly to one of the gates 61 to 64 which is open at that time.

Furthermore, four encoding mode controllers are used as depicted in FIG. 9, but it is assumed, for convenience of description, that the encoding control circuit 102 is identical with the encoding mode control circuit (one of the encoding mode controllers 83 to 86) which is in operation in accordance with an encoding instruction from the encoding sequence controller 81 at that time.

The following will describe in detail the operation of the circuit depicted in FIG. 10. An image to be encoded is stored, as an initial state, in the one-frame memory 101. At this time, a white picture element is represented by a value of "0" and a black picture element by a value of "1". Furthermore, the encoding mode control circuit 102 stores the values of first ΔX and ΔY in the ΔX, ΔY memory 111, a value of "0" in the mode selection memory 112 and a value of "0" in the status selection memory 113.

The operation starts with the encoding by Procedure 1-2 in such a manner as follows: The encoding mode control circuit 102 first provides a plane indicating code to the output terminal 161. An example of plane indicating codes are shown in Table 10. For example, in the case of encoding the plane C at that time, a code "10" is provided. The encoding mode control circuit 102 opens the gate 144. The content of the ΔX, ΔY memory 111 is transferred to the picture element detector 122. The picture element detector 122 successively reads out from the one-frame memory (in order from left to right and from top to bottom of the image frame) 101 the values of picture elements which are to be encoded by Procedure 1-2 and, transfers them to the run-length encoder 151. The run-length encoder 151 determines the use of Table 1 (the code table which is used in Procedure 1-2), since the signals from the mode selection memory 112 and the status selection memory 113 are both the value "0", and further, it determines, on the basis of the values of ΔX and ΔY from the ΔX, ΔY memory 111 and Table 1, which code table is to be used for run-length encoding, thereafter encoding picture signals which are sent from the picture element detector 122.

Upon completion of the extraction of all the picture elements to be encoded, the picture element detector 122 provides a signal on each of input lines $P_{151}$ and $P_{102}$ of the run-length encoder 151 and the encoding mode control circuit 102. Upon reception of the signal from the input line $P_{151}$, the run-length encoder 151 performs an encoding termination process. On the other hand, the encoding mode control circuit 102 verfies, by the reception of the signal from the input line $P_{102}$, that the encoding process by Procedure 1-2 has been finished. The encoding mode control circuit provides the plane indicating code to the output terminal 161. Then it closes the gate 144 and provides a "1" to the mode selection memory 112 and "2" to the status selection memory 113, thereafter opening the gates 145 and 146.

By receiving the values of ΔX and ΔY from the ΔX, and ΔY memory 111 and a "1" from the mode selection memory 112, the picture element detector 122 reads out picture elements of the mode 1 (see FIG. 4) from the one-frame memory 101 in a sequential order (from left to right and from top to bottom) and transfers them to the picture element memory 135. By receiving the values of ΔX and ΔY and a "1" from the mode selection memory 112, the reference picture element detector 121 similarly transfers the picture element values of four picture elements of the mode 1 (see FIG. 4) from the one-frame memory 101 in succession to the reference picture element memories 131 to 134. The two detectors 121 and 122 operate in synchronism with each other so that the four reference picture elements extracted by the reference picture element detector 121 become reference picture elements for the picture element which is detected by the picture element detector (I) 122 at that time. The counter 141 summates the contents of the four reference picture element memories 131, 132, 133 and 134 and provides the result of summation to the comparator 142. The comparator 142 compares the contents of the counter 141 with the contents of the status select memory 113 and, only in the case of coincidence being detected therebetween, opens the gate 143. Upon opening of the gate 143, the contents stored in the picture element memory 135 are transferred to the run-length encoder 151. The run-length encoder 151 encodes into run-length codes the picture elements which are applied thereto via the gate 143. The code table which is used in this case is determined through the use of Table 8 on the basis of the contents of ΔX and ΔY from the ΔX, ΔY memory 111, the value of the mode from the mode selection memory 112 and the status value from the status selection memory 113. The encoded signals are output from the output terminal 161.

Upon completion of the detection of all picture elements to be encoded, a signal is provided on each of the input lines $P_{151}$ and $P_{102}$ of the run-length encoder 151 and the encoding mode control circuit 102. When supplied with the signal from the input line $P_{151}$, the run-length encoder 151 performs an encoding termination process. By receiving the signal from the input line $P_{102}$, the encoding mode control circuit 102 is notified of the end of the encoding process of Procedure 2-1 and closes the gates 145 and 146. Next, the encoding mode control circuit 102 performs encoding by Procedure 2-2. First, it provides the plane indicating code to the output terminal 161. Then, after transferring a value of "1" to the mode selection memory 112 and a "3" to the status selection memory 113, the encoding mode control circuit 102 opens the gates 145 and 146. The subsequent operations are the same as in the case of encoding by Procedure 2-1.

Thereafter encoding by Procedures 2-3 to 2-10 is effected in a similar manner. In the respective procedures, however, the contents of the mode selection memory 112 and the status selection memory 113 are set as follows:

Procedure 2-3: "1" the content of the mode selection memory 112; and "4" the content of the status selection memory 113

Procedure 2-4: "1" the content of the mode selection memory 112; and "4" the content of the status selection memory 113

Procedure 2-5: "1" the content of the mode selection memory 112; and "0" the content of the status selection memory 113

Procedure 2-6: "2" the content of the mode selection memory 112; and "2" the content of the status selection memory 113

Procedure 2-7: "2" the content of the mode selection memory 112; and "3" the content of the status selection memory 113

Procedure 2-8: "2" the content of the mode selection memory 112; and "1" the content of the status selection memory 113

Procedure 2-9: "2" the content of the mode selection memory 112; and "5" content of the status selection memory 113

Procedure 2-10: "2" the content of the mode selection memory 112; and "0" the content of the status selection memory 113

After completion of the encoding by Procedure 2-10, if the contents of ΔX and ΔY stored in the ΔX, ΔY memory 111 are not "1", then the encoding mode control circuit 102 modifies the contents of ΔX and ΔY in the ΔX, ΔY memory 111 to ΔX/2 and ΔY/2, respectively, and then repeats the encoding by Procedures 2-1 to 2-10. When the contents of the ΔX and ΔY in the ΔX, ΔY memory 111 are both the value of "1", the encoding operation is finished.

The above has described the circuit operations for encoding all the contents of one frame-memory. Upon completion of each of Procedures 1-2, 2-1, 2-2, 2-3, 2-4, 2-5, 2-6, 2-7, 2-8, 2-9, and 2-10, the encoding mode control circuit 102 cheeks whether or not the encoding operation has been completed to the stage instructed by the encoding sequence controller 81, and if not, then proceeds to further encoding operation. In the event that the encoding has recited the stage specified by the encoding sequence controller 81, the encoding mode control circuit 102 notifies the encoding sequence controller 81 of the end of encoding operation and suspends its operation while holding the contents such as ΔX, ΔY, the mode, the status, etc. until it receives an instruction of encoding operation from the encoding sequence controller 81.

Figure 11:
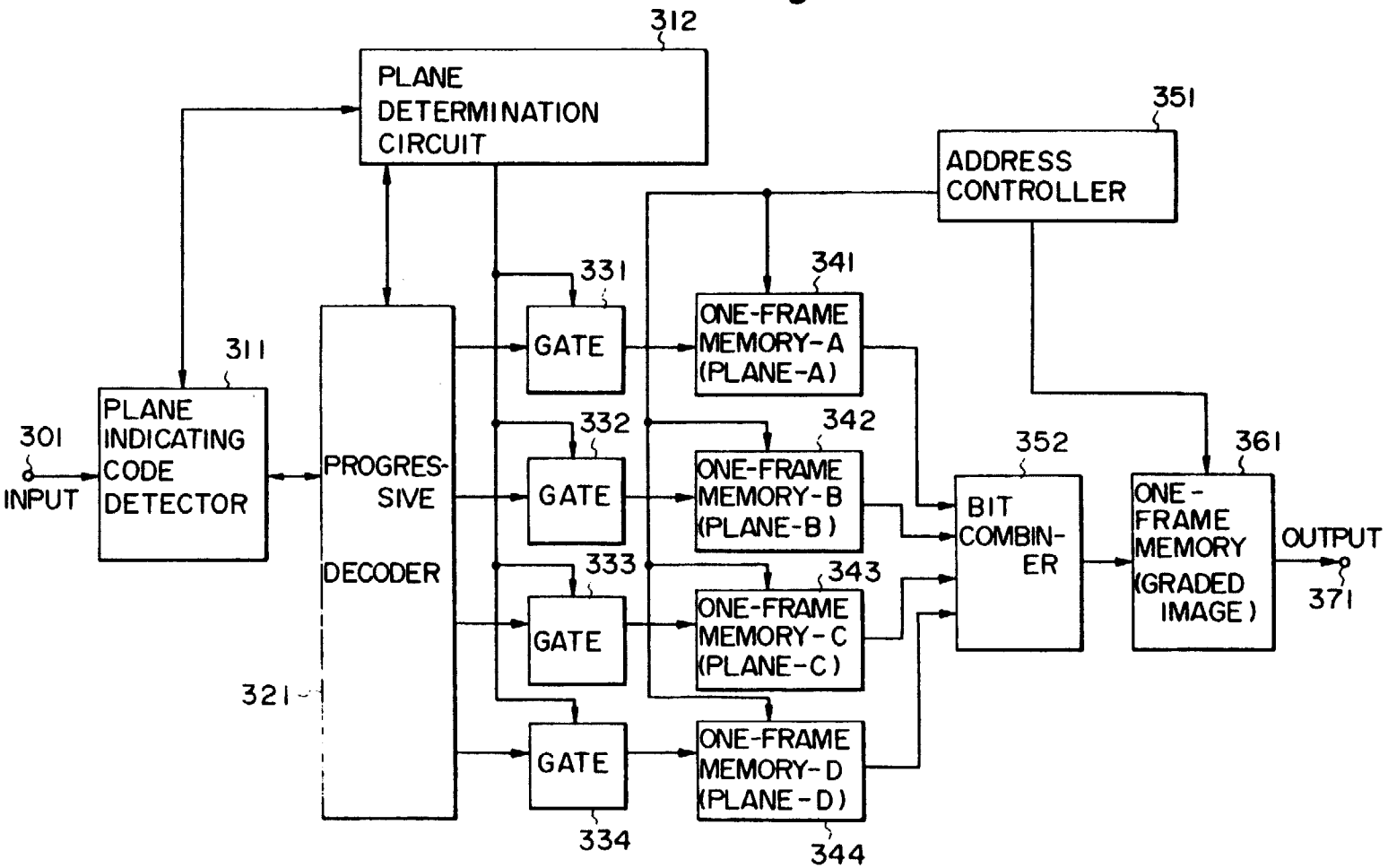
FIG. 11 is a block diagram illustrating an example of a decoder for decoding an encoded signal according to the present invention.

FIG. 11 illustrates an example of a decoding circuit. Reference numeral 301 indicates an input terminal; 311 a plane indicating code detector; 312 a plane determination circuit for determining the plane to be decoded; 321 a progressive decoder; 331, 332, 333 and 334 gates; 341, 342, 343 and 344 one-frame memories A, B, C and D, each storing a plane represented by the binary terms; 351 an address controller; 352 a bit combiner; 361 a one-frame memory for storing a graded image and 371 an output terminal.

In the initial state, a value of "1" is stored in all of the four one-frame memories 341 to 344 an "15" in the one-frame memory 361.

From the input terminal 301 and encoded signal is received. The plane indicating code decoder 311 detects the plane indicating code from the signal received from the input terminal 301 and transfers it to the plane determination circuit 312 and the other codes to the progressive decoder 321. The decoder 321 responds to an instruction from the circuit 312 to decode encoded signal which is transferred thereto from the plane indicating code detector 311. The plane determination circuit 312 detects, from the plane indicating code from the plane indicating code detector 311 and Table 10, the plane indicated by the code which is transferred from the input terminal 301 after the plane indicating code. In accordance with the plane thus detected, the plane determination circuit 312 enables any one of the gates 331 to 334 to select the plane to be decoded and, at the same time, controls the progressive decoder 321. For instance, when receiving a plane indicating code "10" from the plane indicating code detector 311, the plane determination circuit 312 enables the gate 333 for decoding information of the plane C and instructs the decoder 321 to decode the information of the plane C. The minimum unit of decoding is each Procedure (any one of Procedure 1-2, 2-1, 2-2, . . . 2-9, 2-10 ). Upon completion of decoding operation in that unit, the decoder 321 sends a decoding end signal to the plane determination circuit 312. When supplied with the signal, the plane determination circuit 312 disables the enabled gate (any one of the gates 331 to 334) and sends a decoding end signal to the plane indicating code detector 311. Further, when supplied with the decoding end signal from the circuit 312, the plane indicating code detector 311 detects the plane indicating code from the signal input from the input terminal 301, which is followed by the repetition of the above operations.

The progressive decoder 321 transfers the decoded image information signal via the enabled gate (any one of the gates 331 to 334) to a predetermined address of the one-frame memory (any one of the one-frame memories A341 to D344), wherein it is stored.

The address controller 351 instructs the same coordinate to the four one-frame memories 341 to 344 and the one-frame memory for a graded image. The four one-frame memories 341 to 344 transfer to the bit combiner 352 the stored contents at the coordinate instructed by the address controller 351. The bit combiner 352 combines the bit information from the one-frame memories 341 to 344 into a graded image signal (4-bit) by the use of Table 2, and stores it in the one-frame memory 351 at the address corresponding to the coordinate instructed by the address controller 351. For example, when the signals from the one-frame memories 341 to 344 are bits of "1", "0", "1" and "0", respectively, the composite graded image signal goes to a value of "6".

After completion of the decoding operation by the progressive decoder 321 to address controller 351 performs the above procedures for all coordinates in a sequential order from left to right and from top to bottom, starting with the picture element at the top left-hand corner of the image frame. As a result of this, decoded graded image information is obtained in the one-frame memory 361.

Figure 12:
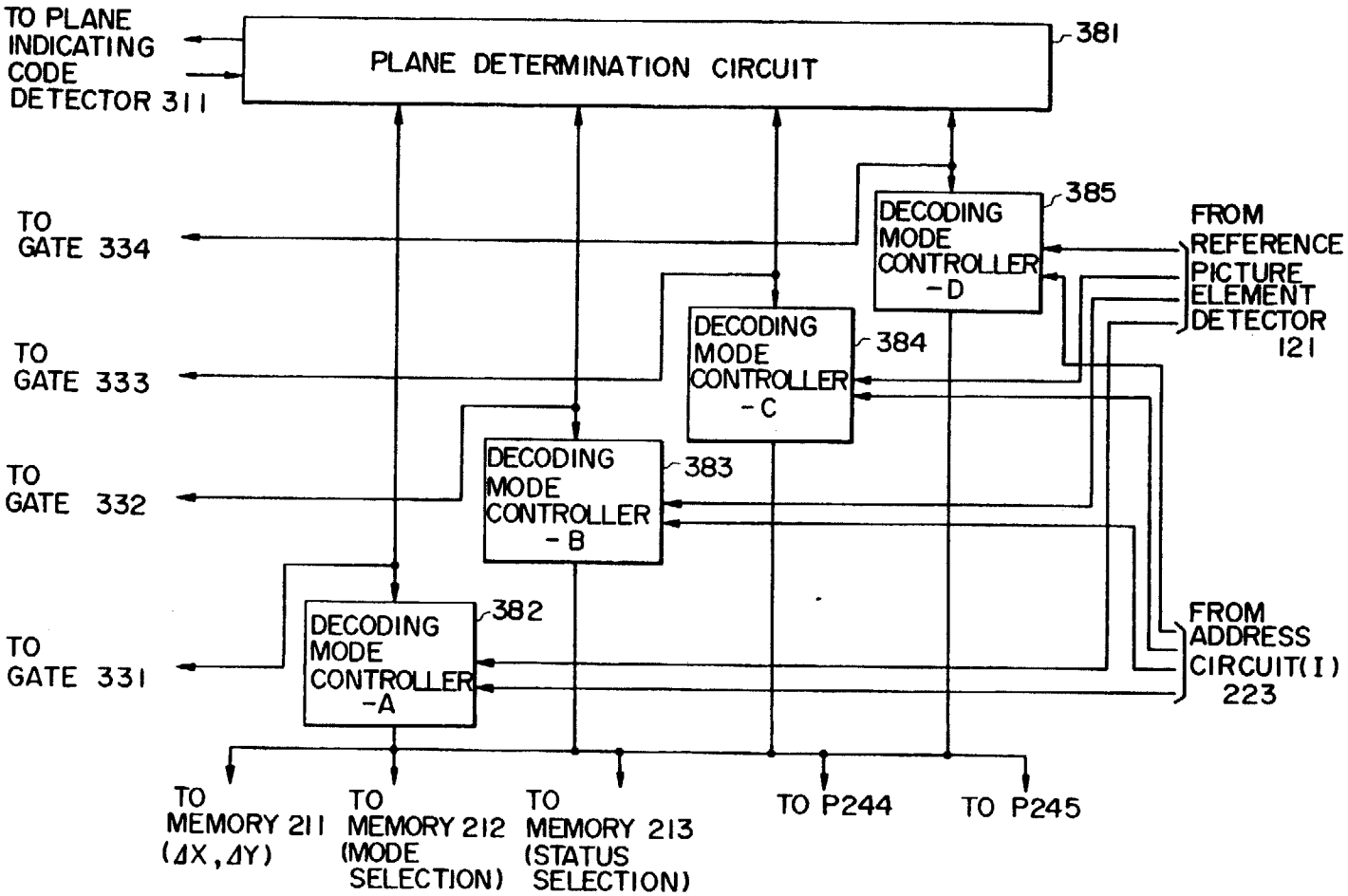
FIG. 12 is a block diagram illustrating an example of a plane determination circuit for used in the circuit depicted in FIG. 11.

The plane determination circuit 312 will hereinbelow be described in detail with reference to the drawings. FIG. 12 illustrates an example of the circuit arrangement of the decoding plane determination circuit 312. Reference numeral 381 identifies a plane determination circuit for determining the plane to be decoded, 382 a decoding mode controller which effects control for the decoding of the one-frame memory A341, and 383, 384 and 385 similar decoding mode controllers which perform control operations for the decoding of the one-frame memories B342, C343 and D344. The decoding mode controllers 382, 383, 384 and 385 store information such as ΔX, ΔY, the mode and status in connection with the decoding operation of the one-frame memories corresponding thereto, thereby store the stage to which their decoding operations have proceeded.

As referred to previously, the decoding plane determination circuit 381 detects, from the plane indicating code from the plane indicating code detector 311 by the use of Table 10, the plane (the one-frame memory) indicated by the code which is transferred from the input terminal 301 after the plane indicating code. In accordance with the thus detected plane the decoding plane determination circuit 381 enables any one of the gates 331 to 334, selecting the plane to be decoded. At the same time, it sends out a decoding command signal to the decoding mode controller (any one of the decoding mode control circuits 382 to 385) which effects control operations for the decoding operations of the one-frame memory (any one of the one-frame memories 341 to 344) which is directly connected to the enabled gate. The decoding mode control circuit, supplied with the signal, performs a decoding operation of one procedure. Upon completion of the decoding operation, the decoding mode control circuit informs the plane determination circuit 381 of the completion of decoding operation. Thereafter, the plane determination circuit 381 transfers the decoding end signal to the plane indicating code detector 311.

Figure 13:
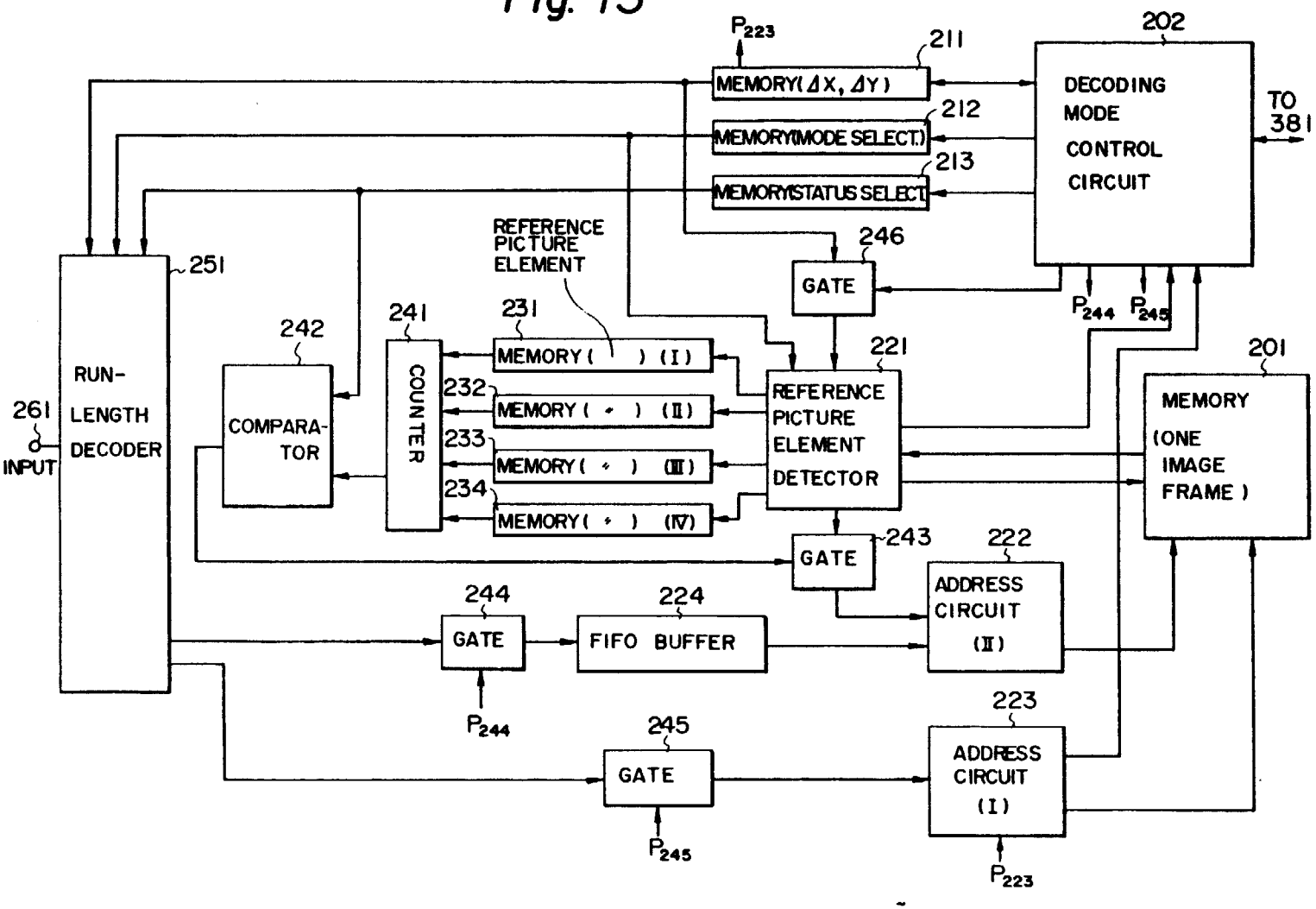
FIG. 13 is a block diagram illustrating an example of a progressive decoder utilized in the circuit shown in FIG. 11.

FIG. 13 illustrates an example of the arrangement of the progressive decoder 321 employed in the decoder depicted in FIG. 11. Reference numeral 201 indicates one-frame memory for storing a decoded image, 202 a decoding mode control circuit for controlling the decoding, 211 a ΔX, ΔY memory for storing the values of ΔX and ΔY, 212 a mode selection memory, 213 a status selection memory, 221 a reference picture element detector for detecting four reference picture elements from the one-frame memory, 222 and 223 address circuits for determining the addresses of picture elements to be decoded, 224 a FIFO (First IN First OUT) buffer, 231, 232, 233 and 234 memories for storing four reference picture elements, 241 a counter for calculating sum total of the values of the four reference picture elements, 242 a comparator for comparing the counter 241 with contents of the status selection memory 213, 246, 243, 244 and 245 gate circuits, 251 a run-length decoder and 261 an input terminal.

In practice, four one-frame memories are employed as shown in FIG. 11, but for convenience of description, let it be assumed that the one-frame memory 201 is identical with the one-frame memory (any one of the one-frame memories 341 to 344) which is connected directly to one of the gates 331 to 334 which is open at that point.

Further, four decoding mode control circuits are used in practice, as depicted in FIG. 12, but for convenience of description, let it be assumed that the decoding mode control circuit 202 is identical with the decoding mode control circuit (any one of the decoding mode control circuits 382 to 385) which is in operation in response to an instruction of decoding from the plane determination circuit 381 at that point.

The operation of the circuit shown in FIG. 13 will hereunder be description in detail. In the initial state the decoding mode control circuit 202 transfers predetermined values of ΔX and ΔY (initial values of ΔX and ΔY used for encoding) to the ΔX, ΔY memory 211, a value of "0" to the mode selection memory 212 and a value of "0" to the status selection memory 213. These memories store such values. Furthermore, the decoding mode control circuit 202 enables the gate 245 via an output line $P_{245}$. The encoded signal is entered from the input terminal 261. The run-length decoder 251 determines the use of Table 3 since signals from the mode selection memory 212 and the status selection memory 213 are both the state "0" and determines, on the basis of the values of ΔX and ΔY received from the ΔX, ΔY memory 211 and Table 3, which code table is utilized for the run-length decoding, thereafter decoding the encoded signal from the input terminal 261. The decoded signal is fed via the gate 245 to the address circuit (I) 223. The address circuit (I) 223 receives the contents of ΔX and ΔY from the ΔX, ΔY memory 211 and transfers the signal, applied thereto via the gate 245, to the one-frame memory 201, wherein it is applied to each of all picture elements $[P(N\times\Delta X+1, M\times\Delta Y+1), (N, M=0,1,2,\ldots)]$ at addresses sequentially spaced ΔX and ΔY apart in the lateral and vertical directions, respectively, starting from the address at the top lefthand corner of the image frame. Having completed the above operation for the entire area of one image frame, the address circuit (I) 223 delivers an end signal to the decoding mode control circuit 202. At this point, the picture elements encoded by Procedure 1-2 are all decoded. Upon receiving the signal from the address circuit (I) 223, the decoding mode control circuit 202 disables the gate 245. At the same time, the decoding mode control circuit 202 instructs the plane determination circuit 381 to end the decoding. Next, when instructed by the plane determination circuit 381 to perform decoding operation, the decoding mode control circuit 202 performs the decoding operation of the picture elements encoded by Procedure 2-1. The decoding mode control circuit 202 provides a value of "1" to the mode selection memory 212 and a value of "2" to the status selection memory 113 and then enables the gates 244 and 246. The run-length decoder 251 receives the values of ΔX and ΔY from the ΔX, ΔY memory 211 and further receives the value of mode (a value of "1" in the case of decoding the picture elements encoded by Procedure 2-1) from the mode selection memory 212 and the status value (a value of "2" in the case of decoding the picture elements encoded by Procedure 2-1) from the status selection memory 213 to thereby determine the code table from Table 8, sequentially decoding required run-lengths. The decoded signal is transferred via the gate 244 to the FIFO buffer 224. The reference picture element detector 221 receives via the gate 242 the values of ΔX and ΔY from the ΔX, ΔY memory 211 and further receives a value of "1" from the mode selection memory 212, reading out of the one-frame memory 201 (from left to right and from top to bottom) the value of quadraplets of picture elements of the mode 1 (see FIG. 4) and transferring them to the four reference picture element memories 231 to 234. The reference picture element memories 231 to 234 store the picture element values transferred from the reference picture element detector 221 and then transfer them to the counter 241. The counter 241 calculates the sum total of the four reference picture element memories 231, 232, 233 and 234 and sends the count value to the comparator 242. The comparator 242 compares the value from the counter 241 with the value from the status select memory 213 and, in the case of coincidence being detected, enables the gate 243. The picture element address determination circuit (II) 222 receives the address of the picture element to be decoded from the reference picture element detector 221 only when the gate 243 is open, and reads out one picture element value from the FIFO buffer 224, thereafter writes the picture element value in the address specified by the reference picture element detector 221. Upon completion of the above procedure for the entire area of one image frame, the reference picture element detector 221 sends to the decoding mode control circuit 202 a signal indicating the completion of the decoding operations of all the picture elements encoded by Procedure 2-1. At the same time, the decoding mode control circuit 202 instructs the plane determination circuit 381 to end the decoding operation. Next, when receiving a decoding instruction from the plane determination circuit 381, the decoding mode control circuit 202 provides a value of "1" to the mode selection memory 212 and a value of "3" to the status selection memory 213 so as to decode picture elements encoded by Procedure 2-2. The subsequent operations are the same as those for decoding the picture elements encoded by Procedure 2-1.

Thereafter, the picture elements encoded by Procedures 2-3 to 2-10 are similarly decoded. In the respective decoding, however, the contents of the mode selection memory 212 and the status selection memory 213 are set as follows:

Decoding of picture elements encoded by Procedure 2-3:
"1" for mode selection memory 212
"1" for status selection memory 213

Decoding of picture elements encoded by Procedure 2-4:
"1" for mode selection memory 212
"4" for status selection memory 213

Decoding of picture elements encoded by Procedure 2-5:
"1" for mode selection memory 212
"0" for status selection memory 213

Decoding of picture elements encoded by Procedure 2-6:
"2" for mode selection memory 212
"2" for selection memory 213

Decoding of picture elements encoded by Procedure 2-7:
"2" for mode selection memory 212
"3" for status selection memory 213

Decoding of picture elements encoded by Procedure 2-8:
"2" for mode selection memory 212
"1" for status selection memory 213

Decoding of picture elements encoded by Procedure 2-9:
"2" for mode selection memory 212
"5" for status selection memory 213

Decoding of picture elements encoded by Procedure 2-10:
"2" for more selection memory 212
"0" for status selection memory 213

Unless the values of ΔX and ΔY stored in the ΔX, ΔY memory 211 are "1" after the above decoding, the decoding mode control circuit 202 alters the values of ΔX and ΔY in the ΔX, ΔY memory 211 to ΔX/2 and ΔY/2, thereafter repeating the decoding procedures for the picture elements encoded by Procedure 2-1 to the decoding procedures for the picture elements encoded by Procedure 2-10.

When the values of ΔX and ΔY in the ΔX, ΔY memory 211 are both the value of "1", the decoding operation comes to an end.

The above has described an embodiment of the present invention. The sequence of Procedures 2-1 to 2-10 is not limited specifically to the abovesaid but the sequence of Procedures 2-1 to 2-5 and 2-6 to 2-10 can be changed.

While in the above the same code table is employed for coding the planes A, B, C and D, different code tables can be used.

Even in the case of encoding picture elements by Procedures 1-2 and 2-1 to 2-10, a known encoding system can be used instead of the run-length encoding system.

Furthermore, the address mode control circuit 202 need not always to perform the abovesaid procedures after completion of the decoding by the progressive decoder 321 but it is also possible to start the procedures in the course of decoding and repeat, after completion of the process for all coordinates in one image frame, the above procedures, beginning from the first picture element (the picture element at the top left-hand corner), until the decoding comes to an end. With this method, for instance, if the contents of the one-frame memory 361 for a graded image are always displayed on a CRT display, a rough image is displayed first and then the image quality is progressively improved as decoding proceeds. Moreover, it is also possible to conduct interpolation processing for undercoded picture element with a view to maximizing the quality of the image displayed at the receiving side. For the interpolation, use can be made of a conventional technique such as a system which represents the undecoded picture elements by already coded ones nearest thereto.

As described above in detail, according to the present invention, a progressive coding system of high coding efficiency can be implemented also for a multi-graded image. Especially, the introduction of the bit plane system permits selection of the image quality from two aspects of resolution and the number of gradation levels, enabling proper transmission of information corresponding to the display capabilities of the receiving terminal which are dependent upon resolution and gradation.

This is particularly marked when the present invention is applied to the storage system for an image data base common to many kinds of terminals, and communication costs can appreciably be cut.

What we claim is:

1. A graded facsimile image signal coding system, comprising means for distributing a multi-graded facsimile picture signal, represented by $2^n$ gradation levels, into n bit planes corresponding to n digits; initial encoding means for detecting, from picture elements forming each bit plane, picture elements at intervals of $\Delta X$ picture elements on every $\Delta Y$-th line and encoding the detected picture elements; and additional encoding means for [further] encoding each one of said [encoded] *picture elements except said detected* picture elements with reference to encoded four picture elements positioned around said one picture element to be encoded.

2. A graded facsimile image signal coding system according to claim 1, in which said additional encoding means comprises mode-1 encoding means for encoding, by referring to four of the encoded picture elements, a picture element surrounded by the four reference picture elements and lying centrally thereof; and mode-2 encoding means for encoding, by referring to four picture elements encoded by the initial encoding means and the mode-1 encoding means, a picture element surrounded by the four picture elements lying above and below it and on its left and right; wherein the initial encoding and mode-1 and mode-2 encoding are effected for each of the n bit planes, using $2^n$ (where n is an integer) as an initial value of each of the $\Delta X$ and $\Delta Y$ and thereafter the mode-1 and mode-2 encoding operations are repeated with the values of the $\Delta X$ and $\Delta Y$ reduced by half.

3. A graded facsimile image signal coding system according to claim 2, in which said mode-1 encoding means and said mode-2 encoding means are formed so as to successively perform for each ones of a plurality of categories of said encoded picture elements, said categories being determined in accordance with the number of black picture elements in said four reference picture elements.

* * * * *